United States Patent [19]

Müller

[11] Patent Number: 4,651,941
[45] Date of Patent: Mar. 24, 1987

[54] APPARATUS FOR TEMPORARY STORAGE OF A STREAM OF PARTIALLY OVERLAPPING SHEETS

[75] Inventor: Hans Müller, Zofingen, Switzerland

[73] Assignee: GRAPHA-Holding AG, Hergiswil, Switzerland

[21] Appl. No.: 572,562

[22] Filed: Jan. 18, 1984

[30] Foreign Application Priority Data

Jan. 21, 1983 [CH] Switzerland .................... 348/83

[51] Int. Cl.$^4$ .................. B65B 63/04; B65H 29/70
[52] U.S. Cl. ........................................ 242/59; 53/118;
53/430; 242/67.3 R
[58] Field of Search .............. 242/67.3 R, 59, 75.44,
242/75.45, 75.51, 75.2, 67.5; 53/118, 430;
198/347, 750, 778

[56] References Cited

U.S. PATENT DOCUMENTS

| | | | |
|---|---|---|---|
| 2,680,573 | 6/1954 | Monkley | 242/67.5 |
| 3,006,569 | 10/1961 | Hasselquist | 242/67.3 R |
| 3,214,110 | 10/1965 | Ross | 242/75.51 X |
| 3,650,490 | 3/1972 | Saunders | 242/75.51 X |
| 3,969,178 | 7/1976 | Jeanson | 242/67.1 R X |
| 4,199,118 | 4/1980 | Tetro et al. | 242/75.44 |
| 4,438,618 | 3/1984 | Honegger | 242/67.3 R X |

FOREIGN PATENT DOCUMENTS

| | | |
|---|---|---|
| 3123888 | 5/1982 | Fed. Rep. of Germany . |
| 2544135 | 11/1982 | Fed. Rep. of Germany . |
| 2092557 | 8/1982 | United Kingdom ................. 242/59 |

Primary Examiner—Stuart S. Levy
Assistant Examiner—Lynn M. Sohacki
Attorney, Agent, or Firm—Peter K. Kontler

[57] ABSTRACT

Apparatus for temporary storage of a stream of partly overlapping paper sheets has a first core which is driven by a first motor in a direction to collect an elastically extensible band while the band receives a succession of sheets which are thereby confined between successive convolutions of the band on the first core. The band is drawn from a second core which is braked with a gradually decreasing force so that the product of such force and the radius of the growing roll of sheets and convolutions of the band on the first core is at least nearly constant. The elongation of the band during winding onto the first core is not less than 0.1 percent.

13 Claims, 4 Drawing Figures

APPARATUS FOR TEMPORARY STORAGE OF A STREAM OF PARTIALLY OVERLAPPING SHEETS

BACKGROUND OF THE INVENTION

The present invention relates to apparatus for temporary storage of a series of sheets, particularly for temporary storage of a stream of partially overlapping paper sheets. Still more particularly, the invention relates to improvements in apparatus for temporary storage of a preferably scalloped stream of paper sheets between the convolutions of a band which is wound onto a core or another suitable rotor.

It is well known to store a scalloped stream of imprinted sheets on the core (first rotor) of a reel by resorting to an elongated band one end portion of which is secured to such core and the other end portion of which is affixed to a second rotor (e.g., a second core). The sheets are delivered onto the band slightly ahead of or at the locus where the band is being wound onto the first rotor, and such sheets form in their entirety a long helix whose convolutions alternate with the convolutions of the band on the first rotor. A prime mover is provided to drive the first rotor in a direction to collect the band, and a brake serves to oppose the movement of the band in a direction from the second toward the first rotor so that the band is maintained under tension, i.e., the brake causes the development of a braking moment acting upon the roll of convoluted band and stream of sheets on the first rotor. Reference may be had, for example, to German Pat. No. 25 44 135 and to German Offenlegungsschrift No. 31 23 888.

The apparatus of German patent No. 25 44 135 comprises means for delivering successive sheets of a scalloped stream of sheets onto the upper side of that portion of the band which is about to be convoluted onto the first rotor so that the sheets are confined between neighboring convolutions of the band. The brake acts upon the band between the two rotors and the band confines successive sheets of the stream between that portion thereof which is immediately adjacent to the growing roll on the first rotor and the outermost convolution of the band on such rotor. A drawback of the patented apparatus is that its first rotor can store only a limited number of freshly imprinted sheets. The reason is that the pressure which the convoluted material applies upon the innermost convolutions of the stored stream of sheets increases with the addition of each fresh convolution of the band. This is due to the fact that the braking device acts upon the band with an unchanging force so that the magnitude of compressive stress acting upon the convolutions of the stored stream increases with each revolution of the first rotor in a direction to gather the band. As the inner convolutions of the stored stream undergo a progressively increasing compressing action, the tensional stress upon the neighboring convolutions of the band decreases with the result that the adjacent sheets can shift relative to each other and relative to the neighboring convolutions of the band. This can adversely influence the quality of the product which is assembled from such sheets after the stream is removed from storage. Furthermore, any relaxation of tension upon the inner convolutions of the band on the first rotor can entail at least some fulling of sheets with attendant drawbacks, such as shifting of the two halves of each sheet which has been folded prior to introduction into storage.

The mode of operation of the apparatus which is disclosed in the aforementioned Offenlegungsschrift is practically identical with that of the apparatus of the aforediscussed German patent. Thus, the apparatus of the Offenlegungsschrift also employs a brake which applies to the band a braking force of unchanging magnitude. Therefore, the inner windings of the stored portion of a stream of paper sheets are subjected to a compressive stress which increases with increasing diameter of the convoluted roll of sheets on the first rotor. Furthermore, the magnitude of torque which must be applied to the first rotor increases proportionally with increasing diameter of the convoluted material. This, combined with the aforediscussed progressively increasing compression of inner convolutions of the stored portion of the stream imparts to the convoluted band a tendency to hang furthermore, each inner convolution of the band on the first rotor moves circumferentially of the first rotor with reference to the next (outer) convolution. This, entails a pronounced shifting of one-half of each folded sheet between the neighboring convolutions of the band relative to the other half (note FIG. 4) so that the position of the fold line between the two halves of each such sheet is changed with attendant problems when the sheets are removed from storage and introduced into a gathering or other sheet processing machine. The problem is aggravated if the band is made of or is coated with an adhesive material. Thus, if one side of the band tends to adhere to the sheets, the sheets (or at least certain sheets) cannot be readily or predictably removed from storage. This will be appreciated by bearing in mind that, if the sheets are provided with multicolored printed matter, certain coloring agent or agents will adhere to the band with a greater force than the other coloring agent or agents. Furthermore, and even if the adherence of sheets to an adhesive band does not present serious problems, the band is likely to cause the development of streaks which affect the appearance of freshly imprinted sheets as well as of the books, brochures or other products which embody such sheets.

OBJECTS AND SUMMARY OF THE INVENTION

An object of the invention is to provide a novel and improved apparatus which can store a stream of sheets between the convolutions of a band on a core or another suitable rotor without risking clockspringing of the band, shifting of neighboring sheets relative to each other, shifting of portions of folded sheets relative to each other, excessive adherence of sheets to the band and/or streaking of sheets as a result of contact with the band.

Another object of the invention is to provide an apparatus which can store one or more long streams of sheets on a rotor without risking excessive compression of sheets which are close to the axis of the core.

A further object of the invention is to provide an apparatus which prevents even temporary loosening of convoluted portions of one or more stored sheets during each and every stage of the storing operation as well as during storage and/or withdrawal of sheets from storage.

An additional object of the invention is to provide an apparatus wherein the braking action upon the band is selected with a view to prevent loosening of sheets, shifting of sheets or portions of sheets relative to each other, undue deformation of sheets during storage and/or other undesirable effects which are observable in apparatus employing heretofore known band braking devices.

Still another object of the invention is to provide a novel and improved method of storing streams of sheets between the convolutions of a band which is wound onto a core or another suitable rotor.

A further object of the invention is to provide a method which reduces the likelihood of damage to, undesirable changes in the orientation of and/or undesirable changes in the appearance of sheets during transport to storage, while in storage and during removal from storage.

An additional object of the invention is to provide a method which positively prevents the band from exhibiting any clockspringing tendencies as a result of winding onto a rotor with partially overlapping sheets between its convolutions.

The invention resides in the provision of an apparatus for storing a stream of sheets, particularly for storing a so-called scalloped stream of partially overlapping sheets wherein the leader of each next-following sheet overlies the trailing portion of the respective preceding sheet. The apparatus comprises first and second rotors which are preferably rotatable about parallel horizontal axes (each rotor can constitute the core of a reel), an expandible band having first and second end portions which are affixed (either permanently or detachably) to the respective rotors and an enlongated median portion which is convoluted on the second rotor prior to admission of sheets for storage in the apparatus, drive means for rotating the first rotor in a direction to convolute the band thereon with attendant unwinding of the median portion from the second rotor, a belt conveyor or other suitable means for supplying the sheets of the stream onto the median portion of the band intermediate the two rotors so that the sheets are confined between successive convolutions of the median portion on the first rotor when the latter is rotated in the direction to collect the band, adjustable braking means for the second rotor, and means for adjusting the braking means so as to reduce the braking action upon the second rotor as the diameter of convoluted median portion of the band on the first rotor increases.

The braking means preferably includes means for applying to the band (through the medium of the second rotor) a variable force acting in the longitudinal direction of the median portion to oppose the winding of such median portion onto the first rotor, and the adjusting means includes means for regulating the magnitude of such force so that the braking moment (i.e., the product of the force and the radius of the outermost convolution of median portion of the band on the first rotor) is at least substantially or approximately constant. The just discussed force preferably exceeds the force which is required to lengthen the band by 0.1 percent.

The adjusting means preferably comprises means for monitoring the diameter of the outermost convolution of the roll of convoluted band on the first rotor. Such monitoring means can include a detector which transmits appropriate signals to an evaluating circuit of the adjusting means, and the circuit regulates the braking action to thus ensure that the braking moment remains at least substantially constant as the diameter of the roll of convoluted band and sheets on the first rotor increases.

The median portion of the band can define a loop and such apparatus can further comprise a dancer roll in the bight of the loop. The aforementioned force tends to reduce the length of the loop, and the apparatus preferably further comprises means for opposing such tendency of the force by resisting, through the medium of the dancer roll, a shortening of the loop. The opposing means can comprise a lever, a fixed fulcrum for the lever, means for securing the dancer roll to the lever at a locus which is remote from the fulcrum, and means for biasing the lever in a first direction. The aforementioned force tends to pivot the lever in a second direction counter to the first direction, and the biasing means is designed to maintain the lever in or close to a preselected angular position in which the length of the loop assumes a predetermined value.

The band can consist of an elastomeric material, e.g., natural rubber.

The drive means can comprise a prime mover (e.g., a polyphase-current motor), and the braking means can comprise a motor which serves to apply to the second rotor torque in a direction to convolute the median portion of the band onto the second rotor.

The direction in which the median portion of the band is convoluted onto the first rotor is such that the median portion has a section immediately adjacent the outermost convolution of the band on the first rotor and such section has an upper side facing the outermost convolution and receiving sheets from the supplying means. This can be achieved in a very simple way if successive increments of the non-convoluted median portion of the band reach the roll of convoluted material at or close to the six o'clock position of the first rotor.

The motor which constitutes the drive means for the first rotor is a variable-speed motor and the adjusting means further comprises means (e.g., a sliding potentiometer) for regulating the speed of the variable-speed motor as a function of changes in the diameter of convoluted median portion of the band on the first rotor. The speed of the conveyor which supplies sheets to the median portion of the band is monitored by a tachometer generator which transmits signals that also influence the speed of the variable-speed motor for the first rotor.

The aforementioned dancer roll can be said to form part of a means for monitoring the tension of the band between the braking means and the first rotor. Such monitoring means transmits signals denoting the monitored tension of the band, and such signals are evaluated by adjusting means for the braking means. A fluid-operated motor is preferably provided to bias the median portion of the band against the roll on the first rotor at the point where the unconvoluted part of median portion of the band merges into the outermost convolution of such band on the first rotor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
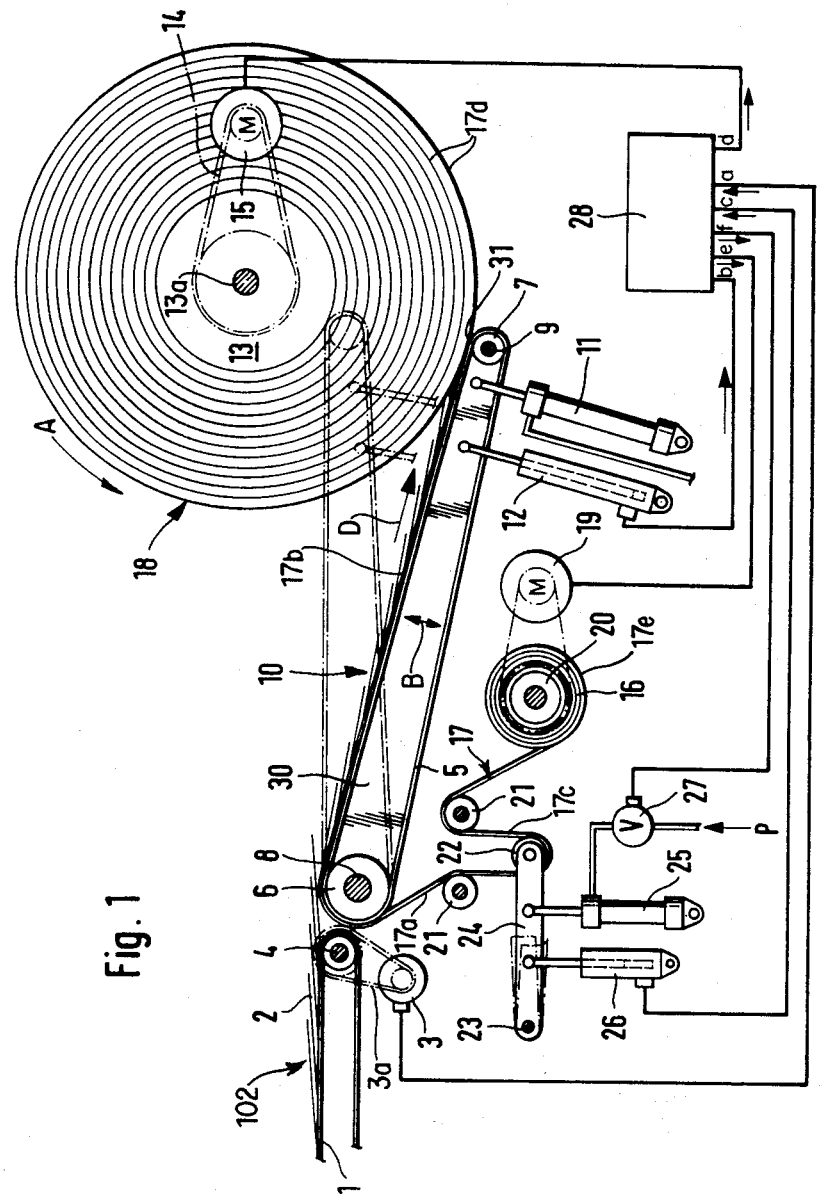
FIG. 1 is a schematic elevational view of an apparatus which embodies one form of the invention, with portions of the apparatus shown in a longitudinal vertical sectional view and with the major part of the median portion of the band convoluted onto the first rotor.
Figure 3:
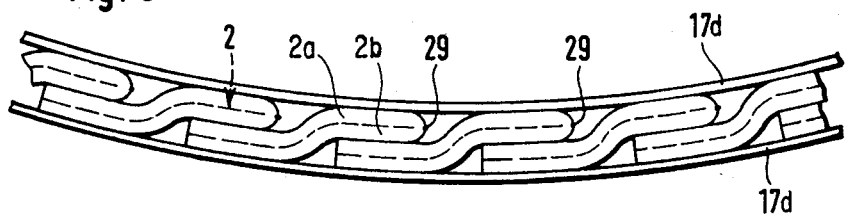
FIG. 3 is a greatly enlarged fragmentary elevational view of two neighboring convolutions of the band on the first rotor and of a series of partially overlapping sheets between such convolutions.

Referring first to FIG. 1, there is shown an apparatus which serves for temporary storage of a continuous or interrupted stream 102 of partially overlapping sheets 2, e.g., sheets of the type shown in FIG. 3 with two overlapping halves 2a, 2b integrally joined to each other along a fold line 29. The sheets 2 in the stream 102 are oriented in such a way that the fold lines 29 constitute the foremost parts of the leaders of such sheets and that the leader of each next-following sheet overlies the trailing portion of the respective preceding sheet. The means for supplying sheets 2 from a folding machine, from a printing machine or from another source includes an endless belt conveyor 1 whose upper reach moves in a direction to the right, as viewed in FIG. 1. The speed of the conveyor 1 is monitored by a device 3 (e.g., a tachometer generator) which monitors the RPM of the shaft 4 for the front pulley of the belt conveyor 1. The monitoring device 3 is connected with the shaft 4 by a belt 3a or another suitable torque transmitting device. The sheet supplying conveyor 1 is followed by a second endless belt conveyor 5 whose pulleys 6 and 7 are mounted in an elongated frame 30 pivotable about the axis of the shaft 8 for the rear pulley 6. The frame 30, the belt conveyor 5 and its pulleys 6, 7 constitute an elongated lever 10 whose fulcrum is at 8 and which is biased in a counterclockwise direction, as viewed in FIG. 1, by a fluid-operated motor 11, e.g., a cylinder and piston unit whose cylinder is articulately mounted in the frame of the sheet storing apparatus and whose piston rod is articulately connected to the frame 30 close to the shaft 9 for the front pulley 7. The conveyor 5 is or can be driven (in a manner not specifically shown in the drawing) so that the speed of its upper reach matches that of the upper reach of the supply conveyor 1. The directions in which the lever 10 is pivotable about the axis of the shaft 8 are indicated by a double-headed arrow B. The arrow D indicates the direction of travel of sheets 2 from the conveyor 1, along the lever 10, and toward a horizontal rotor 13 which can constitute the core of a reel with or without flanges and serves as a means for temporarily storing the stream 102 of partially overlapping sheets 2. The angular position of the lever 10 (and hence the diameter of a roll 18 of convoluted sheets 2 and an elongated extendable band 17 on the rotor 13) is monitored by a sliding potentiometer 12 whose mobile component is articulately connected with the frame 30 and whose stationary component is pivotally secured to the frame of the improved apparatus. As the radius of the roll 18 on the rotor 13 increases, the lever 10 pivots clockwise against the opposition of the motor 11. The drive means for rotating the rotor 13 in a counterclockwise direction (note the arrow A) so as to wind the stream 102 and the band 17 onto the rotor 13 comprises a variable-speed polyphase current motor 15 which transmits torque to the rotor 13 through the medium of a V-belt 14. The bearings (not specifically shown) for the end portions of the shaft 13a of the rotor 13 are mounted in the aforementioned frame of the sheet storing apparatus.

One end portion of the band 17 (this band can be made of or can contain natural rubber or synthetic rubber) is affixed to the rotor 13, and the other end portion of the band is affixed to a second horizontal rotor 20 which is the core of a reel serving for temporary storage of a roll 16 of convoluted band material. The median portion 17a of the band 17 is rather long so that it can form a large number of convolutions 17d on the rotor 13 and/or a large number of convolutions 17e on the rotor 20. When the rotor 13 does not store any sheets 2, the major part of the band 17 is convoluted on the rotor 20, i.e., the diameter of the roll 16 then greatly exceeds the diameter which is shown in FIG. 1. The median portion 17a of the band 17 is trained over two idler rollers 21 which flank a loop 17c of the band. The next part of the median portion 17a is trained over the pulley 6 and overlies the upper reach of the conveyor 5 of the lever 10. The upper reach of the conveyor 5 is tangential to the roll 18 on the rotor 13. It will be noted that the section 17b of the median portion 17a of the band 17 has an upper side which faces away from the lever 10 and toward the outermost convolution 17d of the band 17 on the roll 18, i.e., toward the outermost convolution of the median portion 17a on the rotor 13. This renders it possible to supply the sheets 2 onto the upper side of the section 17b and to confine the sheets between neighboring convolutions 17d of the band 17 so that the sheets together form a helix whose convolutions alternate with the convolutions of the band 17.

The means for braking the band 17 so that the latter opposes rotation of the rotor 13 in a counterclockwise direction (arrow A) comprises an adjustable motor 19 which tends to rotate the rotor 20 in a counterclockwise direction, i.e., in a direction to increase the supply (roll 16) of convoluted band portion 17a on the rotor 20. The motor 19 can constitute a polyphase current motor.

Figure 2:
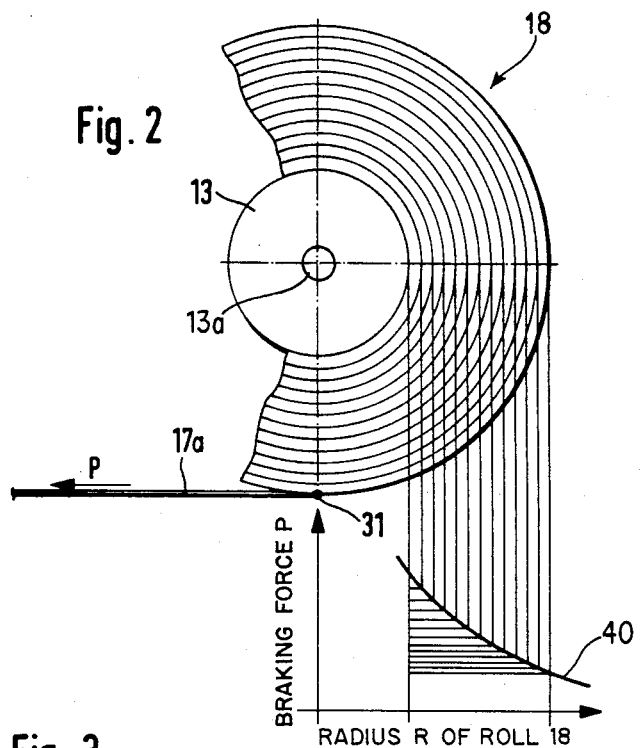
FIG. 2 illustrates a portion of the roll on the first rotor and a coordinate system with a curve representing changes of the braking moment as a function of changes in the radius of the roll on the first rotor.

The bight of the aforementioned loop 17c between the idler rollers 21 receives a dancer roll 22 which is rotatably mounted on the right-hand end portion of a lever 24. The other end portion of the lever 24 is free to pivot about the axis of a fixed horizontal fulcrum 23. When the band 17 is driven to wind itself upon the rotor 13 (i.e., when the prime mover 15 is on), the median portion 17a tends to lift the dancer roll 22 above the illustrated position because such median portion 17a is tensioned lengthwise (note the force which is indicated in FIG. 2 by the arrow P) by the braking motor 19. The tendency of the dancer roll 22 to rise to a higher level (i.e., the tendency of the lever 24 to pivot counterclockwise due to the action of the force P) is opposed by an adjustable fluid-operated motor 25 here shown as a cylinder and piston unit whose cylinder is pivotally mounted in the frame of the sheet storing apparatus and whose piston rod is articulately connected to the lever 24 between the fulcrum 23 and the dancer roll 22. The angular position of the lever 24 (and hence the length of the loop 17c and the level of the dancer roll 22) is monitored by a sliding potentiometer 26 whose mobile component is articulately connected to the lever 24 and whose stationary component is pivotally mounted in the frame of the improved apparatus. An adjustable pressure regulating valve 27 is provided to select the force with which the motor 25 opposes pivotal movements of the lever 24 under the action of the band portion 17c (force P) so that the level of the dancer roll 22 remains at least substantially unchanged. Signals for adjustment of the setting of pressure regulating valve 27 are furnished by an evaluating circuit 28 having a first input a connected to the output of the tachometer generator 3, a second input b connected to the output of the potentiometer 12 and a third input c connected to the output of the potentiometer 26. The three outputs d, e, f of the evaluating circuit 28 are respectively connected to the control circuit for the motor 15, to the control circuit for the motor 19 and to the solenoid or another control element of the pressure regulating valve 27. The evaluating circuit 28 can constitute a simple computer or any other well known device which can evaluate a series of incoming signals and can transmit appropriate output signals for proper operation of the motors 15, 19 and for proper adjustment of the force which is applied by the motor 25 to maintain the dancer roll 22 at a selected level (i.e., to ensure that the length of the loop 17c will remain substantially unchanged). The evaluating circuit 28 and the potentiometer 12 can be said to constitute a means for adjusting the braking motor 19 in a manner as will be explained with reference to FIG. 2. The pressure regulating valve 27 can be designed to connect the motor 25 with a source of pressurized fluid, with a sump or with the atmosphere (depending upon whether the fluid is a liquid or a gaseous medium). If the fluid is a gas, the valve 27 can be arranged to connect the motor 25 with a suction generating device or with a source of compressed gas.

As mentioned above, the band 17 consists of or contains an elastomeric material, such as natural rubber or a synthetic plastic substance whose elasticity modulus is closer to that of natural rubber than to the elasticity modulus of an alloy. Bands which have been tested and found to be highly satisfactory will expand by at least 0.1 percent, preferably by between 0.5 and 1 percent in response to a tensional stress which equals or approximates 1 kg/mm². It is also possible to employ bands whose elasticity is more pronounced; however, it is then necessary to employ bands having a larger cross-sectional area with attendant increase in cost. The elastic limit of a synthetic plastic material can be lower than that of natural rubber; however, such elastic limit should not be appreciably exceeded in response to tensional stresses which arise when the band is in actual use.

The operation is as follows:

At least the major part of the median portion 17a of the band 17 is convoluted on the rotor 20 to form a relatively large roll 16 prior to start of delivery of sheets 2 onto the lever 10. The motor 11 urges the right-hand end portion of the lever 10 upwardly so that the lever 10 assumes the phantom-line position of FIG. 1, i.e., the section 17b of the median portion 17a abuts against the peripheral surface of the rotor 13 or against the outermost convolution 17d of the band 17 on such rotor.

When the conveyor 1 begins to supply a succession of sheets 2, the prime mover 15 is started simultaneously with the braking motor 19 whereby the rotor 13 rotates in a counterclockwise direction (arrow A) and convolutes the median portion 17a of the band 17 therearound. Thus, the radius R (FIG. 2) of the roll 18 grows and the diameter of the roll 16 decreases. The evaluating circuit 28 regulates the difference between the RPM of the prime mover 15 and the RPM of the braking motor 19 in such a way that the motor 19 brakes the rotor 20, i.e., the median portion 17a of the band 17 is subjected to a tensional stress which is represented by the force P shown in FIG. 2. Such force opposes the winding of median portion 17a onto the rotor 13. The RPM of the prime mover 15 is a function of the intensity or another characteristic of the signal which is transmitted by the speed monitoring device 3, i.e., a function of the rate at which the conveyor 1 supplies sheets 2 into the range of the section 17b of the band 17 on the lever 10. Another parameter which influences the RPM of the prime mover 15 is the angular position of the lever 10, i.e., the intensity or another characteristic of the signal which is transmitted by the potentiometer 12. The regulating action of the evaluating circuit 28 is such that the speed of translatory movement of the band 17 in the direction of arrow D matches the speed of the conveyor 1 irrespective of the radius R of the roll 18, i.e., irrespective of the angular position of the lever 10.

The evaluating circuit 28 regulates the speed of the braking motor 19 as a function of changes in length of the loop 17c, i.e., as a function of changes in the intensity or another characteristic of the signal which is transmitted by the potentiometer 26. This is tantamount to regulation of the magnitude of force P acting upon the band 17 in a direction to oppose winding of such band onto the rotor 13. The arrangement is such that the braking motor 19 is accelerated or decelerated for the purpose of ensuring that the lever 24 for the dancer roll 22 returns to its predetermined angular position.

Finally, the evaluating circuit 28 also regulates the pressure of fluid which is admitted into the motor 25 via pressure regulating valve 27. Thus, as the diameter of the roll 18 on the rotor 13 increases, the pressure of fluid which is admitted into the motor 25 decreases. In other words, as the radius R of the roll 18 on the rotor 13 increases, the pressure of fluid which is supplied to the motor 25 decreases with attendant reduction of the braking force P and braking moment PxR because the evaluating circuit 28 regulates the braking motor 19 as a function of the angular position of the lever 24 for the dancer roll 22, i.e., the magnitude of the force P decreases with increasing radius R so that the product of P and R is at least substantially constant. The curve 40 in FIG. 2 denotes the relationship between the magnitude of the force P and the radius R of the roll 18 on the rotor 13. It will be noted that the evaluating circuit 28 regulates the motor 25 as a function of changes in the radius R of the roll 18 and that the braking action of the motor 19 is regulated as a function of changes in the angular position of the lever 24, i.e., in the level of the dancer roll 22 and the length of the loop 17c. The reference number 31 denotes in FIGS. 1 and 2 the point where successive increments of the section 17b of median portion 17a of the band 17 are converted into the outermost convolution 17d of the band forming part of the growing roll 18 on the rotor 13.

When the making of the roll 18 on the rotor 13 begins, the setting of the valve 27 is such that the motor 25 opposes any upward movement of the dancer roll 22 with a maximal force because the lever 10 then assumes or is close to the phantom-line position of FIG. 1. Therefore, the braking action of the motor 19 is very pronounced because the band 17 must furnish a force P which opposes a lengthening of the loop 17c beyond the predetermined value. The lever 10 pivots gradually in a clockwise direction, as viewed in FIG. 1, as the radius R of the roll 18 on the rotor 13 increases whereby the changing signal which is transmitted by the potentiometer 12 induces the evaluating circuit 28 to gradually change the setting of the valve 27 so that the force which the motor 25 applies to the lever 24 (in order to pivot this lever in a clockwise direction, as viewed in FIG. 1) decreases proportionally with increasing radius R. This, in turn, causes the potentiometer 26 to effect a reduction of the braking action of the motor 19 upon the rotor 20 so that the magnitude of the force P decreases proportionally with increasing radius R. This ensures that the braking moment P×R at the point 31 remains at least substantially constant.

Figure 4:
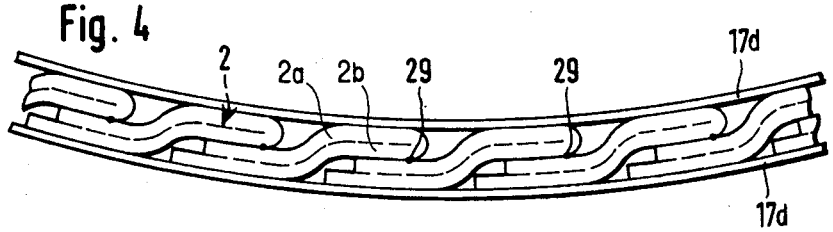
FIG. 4 is a view similar to that of FIG. 3 but showing the sheets in positions they assume during storage on the first rotor of a conventional apparatus wherein the band is subjected to the action of a constant braking force while the first rotor is driven in a direction to collect the band.

It has been found that the material and dimensions of the band 17 should be selected in such a way that, when the winding of the band onto the rotor 13 is completed, elastic elongation or stretching of the band should amount to at least 0.1 percent to thus elastically compensate for shrinkage or contraction of sheets 2 which are subjected to radial compressive stresses while stored between the convolutions of the band 17 on the rotor 13. This reduces the tendency of the band 17 to clock-spring and ensures that the halves 2a and 2b of stored sheets 2 are not shifted relative to each other in a manner as shown in FIG. 4 which shows a portion of a stream of sheets stored on the first rotor of a conventional apparatus. It will be noted that the fold lines 29 between the halves 2a and 2b of the sheets 2 shown in FIG. 4 are shifted from the foremost ends of the leaders of such sheets in contrast to the sheets 2 of FIG. 3 which are stored between the convolutions of the band 17 forming part of the roll 18 on the rotor 13 of the improved apparatus.

An important advantage of the improved sheet storing apparatus is that the rotor 13 can accumulate a large roll 18 without causing any undesirable changes in orientation and/or configuration of stored sheets. This is due to the aforediscussed feature that the braking force which acts upon the band 17 is reduced as the radius R of the roll 18 increases and also that elastic elongation of the band 17 in the course of and upon completion of the winding operation is not less than 0.1 percent.

The manner in which the sheets 2 are removed from storage on the rotor 13 forms no part of the invention. This involves rotation of the rotor 20 in a direction to collect the band 17 (i.e., to increase the diameter of the roll 16) whereby the sheets 2 return onto the conveyor 5 whose upper reach then moves in a direction to the left, as viewed in FIG. 1. The conveyor 5 delivers successive sheets 2 onto the conveyor 1 or onto another conveyor for transport to a gathering or another sheet processing machine. The evaluating circuit 28 is well known and available at Grapha Electronic AG, Zofingen, Switzerland (Typ R 740).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for storing a stream of sheets, particularly a stream of partially overlapping sheets, comprising first and second rotors; an expandible band having first and second end portions affixed to the respective rotors and an elongated median portion which s convoluted on said second rotor prior to storing of sheets; drive means for rotating said first rotor in a direction to convolute the band thereon with attendant unwinding of the band from said second rotor; means for supplying the sheets of said stream onto the median portion of said band intermediate said rotors so that the sheets are confined between successive convolutions of said band on said first rotor when the latter is rotated in said direction; adjustable braking means for applying force to said band; and means for adjusting said braking means so as to reduce the braking force upon said band as the diameter of convoluted median portion of the band on said first rotor increases to thereby counteract the tendency of the sheets between neighboring convolutions of the band to shift relative to each other.

2. The apparatus of claim 1, wherein said force applied by said adjustable braking means acts in the longitudinal direction of said median portion and opposes the winding of such median portion onto said first rotor, said adjusting means including means for regulating the magnitude of said force so that the product of such force and the radius of outermost convolution of median portion of the band on said first rotor is at least substantially constant.

3. The apparatus of claim 2, wherein said force exceeds that which is required to lengthen the band by 0.1 percent.

4. The apparatus of claim 2, wherein said adjusting means comprises means for monitoring the diameter of the outermost convolution of median portion of the band on said first rotor.

5. The apparatus of claim 4, wherein the median portion of said band defines a loop and further comprising a dancer roll in the bight of said loop, said force tending to reduce the length of said loop and further comprising means for opposing such tendency of said force through the medium of said dancer roll.

6. The apparatus of claim 5, wherein said opposite means includes a lever supporting said roll and tending to pivot in a first direction under the action of said force through the medium of the median portion of said band, and means for biasing said lever in a second direction counter to the first direction so that the lever dwells in or close to a predetermined angular position while said drive means rotates the first rotor in a direction to convolute the median portion of the band thereon.

7. The apparatus of claim 2, wherein said band cosists of or contains elastomeric material.

8. The apparatus of claim 7, wherein said material is rubber.

9. The apparatus of claim 2, wherein said drive means comprises a prime mover and said braking means comprises a motor which is arranged to apply to said second rotor torque in a direction to convolute the median portion of said band onto said second rotor.

10. The apparatus of claim 1, wherein the median portion includes a section immediately adjacent to the outermost convolution of such median portion on said first rotor and having an upper side facing the outermost convolution, said supplying means including a conveyor arranged to deliver sheets onto the upper side of said section.

11. The apparatus of claim 1, wherein said drive means comprises a variable-speed motor and said adjusting means further comprises means for regulating the speed of said motor as a function of changes in the diameter of the convoluted median portion of the band on said first rotor.

12. The apparatus of claim 11, wherein said sheet supplying means comprises a conveyor and said adjusting means further comprises means for monitoring the speed of said conveyor, said regulating means including means for regulating the speed of said motor as a function of changes in speed of said conveyor.

13. The apparatus of claim 1, further comprising means for biasing the median portion of the band against the roll on said first rotor.

* * * * *